J. J. CRIDER.
Grain Screen.

No. 84,345.

Patented Nov. 24, 1868.

Witnesses
J Snowden Bell
Wm B Deming

Inventor
J J Crider
By Knight Bros
Attorney

United States Patent Office.

JOHN J. CRIDER, OF GREENFIELD, INDIANA.

Letters Patent No. 84,345, dated November 24, 1868.

IMPROVEMENT IN GRAIN-SCREENS.

The Schedule referred to in these Letters Patent and making part of the same.

*To all whom it may concern:*

Be it known that I, JOHN J. CRIDER, of Greenfield, in the county of Hancock, and State of Indiana, have invented a new and useful Improvement in "Grain-Screens;" and I do hereby declare the following to be a full, clear, and exact description thereof, reference being had to the accompanying drawings, which are made a part of this specification, and in which—

Figure 1:
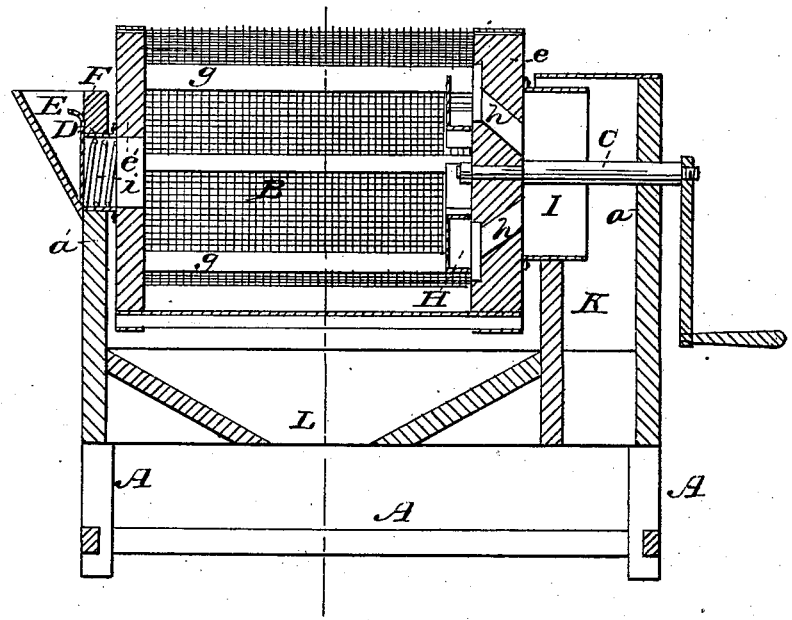
Figure 1 is a vertical longitudinal section of the machine.
Figure 2:
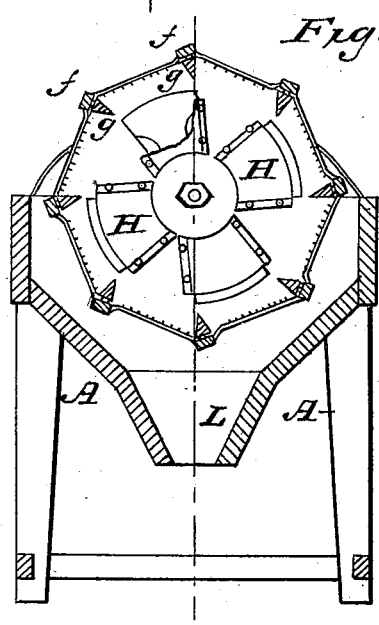
Figure 2 is a transverse vertical section on the line $a\ b$, fig. 1.

The grain is fed by a spiral conveyer into one end of the rotary cylinder, at about the axis thereof; is raised at the discharge-end by means of slats, drops from them into pockets on one of the screen-heads, passes through holes in the latter, and falls into the delivering-tube and discharge-chute. This latter arrangement affords a means of delivering the grain at a point in the vicinity of the axis, instead of making openings near the periphery.

In the drawings, A is the frame of the machine, upon which the screen B is supported. Its axial shaft C is journalled in the standard $a$ of the frame, and the short tube D, forming its other journal, rests in the other standard, $a'$. This tube has a spiral ridge or flange, $i$, which feeds the grain gradually from the hopper E to the inside of the screen, which is formed of two heads, $e\ e'$, longitudinal slats, $f\ f$, which are prolonged internally, to form shelves, $g$, and a wire covering, which may have square and long meshes in alternate panels, for cockle and cheat respectively, though their usefulness is not confined to the removal of those grains alone, but of grass and weed-seeds, and dirt.

The hopper E has a damper, F, which allows grain to pass in graduated quantities.

The grain passes the length of the screen, and is continually elevated and dropped, by lodging upon and slipping from the shelves $g\ g$. Upon arriving at the discharge-end, the grain, as it drops from the shelves, is caught by the pockets or cups H, which are attached to the head $e'$, and present their openings towards the periphery. The grain collected in the cups H passes, by apertures $h$, through the head $e$, into the tube I, whence it drops into the chute K in a clean condition.

The small offal and dirt pass through the meshes of the screen into the space L, and are thence discharged from the machine, separate from the plump grain.

Having described my invention,

What I claim therein as new, and desire to secure by Letters Patent, is—

1. The head $e'$, provided with cups H and apertures $h$, adapted to collect and deliver the grain, substantially in the manner shown and described.

2. The worm or spiral conveyer $i$, in its application to the feed-end of a rotating grain-screen, and adapted to feed the grain in regular quantity, substantially as described.

JOHN J. CRIDER.

Witnesses:
 JACOB SLIFER,
 R. A. RILEY.